United States Patent
Lee et al.

(10) Patent No.: US 11,581,577 B2
(45) Date of Patent: Feb. 14, 2023

(54) COMPOSITION FOR GEL POLYMER ELECTROLYTE INCLUDING FLUOROALKYLENE OLIGOMER, LITHIUM SALT, AND PHOSPHATE OR BORAN-BASED ADDITIVE, GEL POLYMER ELECTROLYTE PREPARED THEREFROM, AND LITHIUM SECONDARY BATTERY INCLUDING THE GEL POLYMER ELECTROLYTE

(71) Applicant: LG Chem, Ltd., Seoul (KR)

(72) Inventors: Jung Hoon Lee, Daejeon (KR); Kyoung Ho Ahn, Daejeon (KR); Chul Haeng Lee, Daejeon (KR); Jeong Woo Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 211 days.

(21) Appl. No.: 16/638,612

(22) PCT Filed: Nov. 30, 2018

(86) PCT No.: PCT/KR2018/015100
§ 371 (c)(1),
(2) Date: Feb. 12, 2020

(87) PCT Pub. No.: WO2019/108019
PCT Pub. Date: Jun. 6, 2019

(65) Prior Publication Data
US 2020/0251776 A1 Aug. 6, 2020

(30) Foreign Application Priority Data
Nov. 30, 2017 (KR) .................. 10-2017-0163716

(51) Int. Cl.
| | | |
|---|---|---|
| H01M 10/0565 | (2010.01) | |
| C08G 69/02 | (2006.01) | |
| C08K 5/524 | (2006.01) | |
| H01M 10/0525 | (2010.01) | |
| H01M 4/02 | (2006.01) | |

(52) U.S. Cl.
CPC ........ H01M 10/0565 (2013.01); C08G 69/02 (2013.01); C08K 5/524 (2013.01); H01M 10/0525 (2013.01); H01M 2004/027 (2013.01); H01M 2004/028 (2013.01); H01M 2300/0065 (2013.01); H01M 2300/0085 (2013.01)

(58) Field of Classification Search
CPC .................. H01M 10/0565; H01M 10/0525
USPC ............................ 429/300, 302, 303
See application file for complete search history.

(56) References Cited

U.S. PATENT DOCUMENTS

| | | | |
|---|---|---|---|
| 9,601,807 B2 | 3/2017 | Long | |
| 10,243,239 B1 | 3/2019 | Ahn et al. | |
| 10,714,791 B2 * | 7/2020 | Ahn | H01M 4/525 |
| 2004/0146778 A1 | 7/2004 | Lee et al. | |
| 2006/0240326 A1 * | 10/2006 | Lee | H01M 10/0525 |
| | | | 429/317 |
| 2008/0118843 A1 * | 5/2008 | Tarnopolsky | H01M 4/13 |
| | | | 429/332 |
| 2009/0011340 A1 | 1/2009 | Lee et al. | |
| 2011/0183213 A1 | 7/2011 | Inoue et al. | |
| 2012/0301795 A1 * | 11/2012 | Kaneko | H01M 10/052 |
| | | | 429/188 |
| 2013/0236790 A1 * | 9/2013 | Byun | H01M 10/0567 |
| | | | 29/623.5 |
| 2016/0028111 A1 | 1/2016 | Ahn et al. | |
| 2016/0043435 A1 | 2/2016 | DeSimone | |
| 2016/0181659 A1 | 6/2016 | Long | |
| 2016/0329600 A1 * | 11/2016 | Lee | H01M 4/623 |
| 2017/0229735 A1 | 8/2017 | Ahn et al. | |
| 2018/0171063 A1 | 6/2018 | Oh et al. | |
| 2018/0342767 A1 * | 11/2018 | Ahn | H01M 10/0565 |
| 2019/0214681 A1 | 7/2019 | Lee et al. | |

FOREIGN PATENT DOCUMENTS

| | | | | |
|---|---|---|---|---|
| CN | 1855604 A | 11/2006 | | |
| CN | 102136601 A | 7/2011 | | |
| CN | 106797048 A | 5/2017 | | |
| CN | 107078342 A | 8/2017 | | |
| CN | 107078353 A | 8/2017 | | |
| EP | 3203565 A1 | 8/2017 | | |
| KR | 10-2004-0020640 A | 3/2004 | | |
| KR | 10-2011-0086513 A | 7/2011 | | |
| KR | 10-2012-0022870 A | 3/2012 | | |
| KR | 10-2015-0050508 A | 5/2015 | | |
| KR | 10-2015-0139827 A | 12/2015 | | |
| KR | 10-2016-0040127 A | 4/2016 | | |
| KR | 10-2017-0100289 A | 9/2017 | | |
| WO | WO-2016053065 A1 * | 4/2016 | ........ | H01M 10/0525 |
| WO | WO-2018044129 A1 * | 3/2018 | ........ | C08L 71/02 |

OTHER PUBLICATIONS

Wong, Hiu Ching, "Perfluoropolyether-based Electrolytes for Lithium Battery Applications", Univ. of North Carolina at Chapel Hill, pp. 1-160 (2015).

(Continued)

*Primary Examiner* — Sean P Cullen

(74) *Attorney, Agent, or Firm* — Morgan, Lewis & Bockius LLP

(57) ABSTRACT

The present invention provides a composition for a gel polymer electrolyte, the composition including: an oligomer represented by Formula 1; an additive; a polymerization initiator; a lithium salt; and a non-aqueous solvent, the additive including at least one compound selected from the group consisting of a substituted or unsubstituted phosphate-based compound and a substituted or unsubstituted benzene-based compound, a gel polymer electrolyte prepared using the same, and a lithium secondary battery.

6 Claims, No Drawings

(56) References Cited

OTHER PUBLICATIONS

Extended European Search Report issued from the European Patent Office dated Apr. 28, 2020 in corresponding European patent application No. 18882349.1.

* cited by examiner

COMPOSITION FOR GEL POLYMER ELECTROLYTE INCLUDING FLUOROALKYLENE OLIGOMER, LITHIUM SALT, AND PHOSPHATE OR BORAN-BASED ADDITIVE, GEL POLYMER ELECTROLYTE PREPARED THEREFROM, AND LITHIUM SECONDARY BATTERY INCLUDING THE GEL POLYMER ELECTROLYTE

CROSS-REFERENCES TO RELATED APPLICATIONS

This application is a U.S. national phase application, pursuant to 35 U.S.C. 371, of PCT/KR2018/015100, filed Nov. 30, 2018, designating the United States, which claims priority to Korean Patent Application No. 10-2017-0163716, filed on Nov. 30, 2017. The entire contents of the aforementioned patent applications are incorporated herein by this reference.

TECHNICAL FIELD

The present invention relates to a composition for a gel polymer electrolyte, a gel polymer electrolyte prepared therefrom and lithium secondary battery including the same, and more specifically, to a composition for a gel polymer electrolyte having improved high-temperature safety, a gel polymer electrolyte prepared therefrom, and a lithium secondary battery including the same.

BACKGROUND ART

Demands for secondary batteries as an energy source have been significantly increased as technology development of and demands for mobile devices have increased, and among such secondary batteries, lithium secondary batteries having high energy density and voltage have been commercialized and widely used.

A lithium secondary battery is produced by a process in which an electrode assembly is prepared by coating current collectors with a positive electrode active material and a negative electrode active material to have appropriate thicknesses or forming an active material itself to have a film shape having an appropriate length, and then winding or laminating the resultant product together with an insulating separator, the electrode assembly is put into a can or a container similar thereto, and an electrolyte is then injected into the can or container.

A lithium metal oxide is used as the positive electrode active material, and a lithium metal, a lithium alloy, crystalline or amorphous carbon, or a carbon composite is used as the negative active material. In addition, a liquid electrolyte, particularly, an ion conductive liquid electrolyte in which a salt is dissolved in a non-aqueous organic solvent, has been mainly used, as the electrolyte.

However, recently, as interests in energy storage technologies have been increasingly grown, there is a need to develop a secondary battery which is capable of charging and discharging with compact, light and high-capacity performances, as well as having high-temperature and high-voltage safety.

Meanwhile, when a secondary battery is driven at high temperature under high voltage, an exothermic phenomenon may frequently occur in the lithium secondary battery according to the increase in internal temperature. Thus, there is a problem in that a liquid electrolyte consisting only of an organic solvent and a salt typically has a low high-temperature safety, so once ignition is initiated, combustion occurs spontaneously even if a supply of electric current from the outside is cut off To solve the problem, there is a need to develop a battery using a gel polymer electrolyte which has high-temperature safety by itself unlike a liquid electrolyte.

(Patent document 1) Korean Patent Application Laid-open Publication No. 10-2015-0139827

DISCLOSURE OF THE INVENTION

Technical Problem

To solve the above-described problem, the present invention provides a composition for a gel polymer electrolyte, a gel polymer electrolyte prepared therefrom, and a lithium secondary battery including the same, the composition being capable of improving high-temperature safety of a battery without deteriorating a battery performance.

Technical Solution

In an aspect, the present invention provides a composition for a gel polymer electrolyte, the composition including: an oligomer represented by Formula 1 below; an additive; a polymerization initiator; a lithium salt; and a non-aqueous solvent, wherein, the additive includes at least one compound selected from the group consisting of a substituted or unsubstituted phosphate-based compound and a substituted or unsubstituted benzene-based compound.

[Formula 1]

In Formula 1,

A is a unit including an alkylene group having 1 to 5 carbon atoms, which is substituted with at least one fluorine or unsubstituted, B and B' are each independently a unit including an amide group, C and C' are each independently a unit including a (meth)acrylate group, and m is an integer of 1 to 100.

Meanwhile, the substituted or unsubstituted phosphate-based compound may include a compound represented by Formula 2 below.

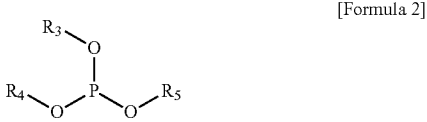

[Formula 2]

In Formula 2, $R_3$, $R_4$, and $R_5$ are each independently at least one selected from the group consisting of an alkyl group having 1 to 5 carbon atoms, which is substituted with at least one halogen group, and a silyl group.

In addition, the substituted or unsubstituted benzene-based compound may include a compound represented by Formula 3 below.

[Formula 3]

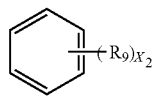

In Formula 3, $R_9$ is at least one selected from the group consisting of halogen group and a substituted or unsubstituted alkyl group having 1 to 5 carbon atoms, and $X_2$ is an integer selected from among 1 to 6.

In addition, the oligomer may include at least one compound selected from the group consisting of compounds represented by Formulae 1-1 to 1-6 below.

[Formula 1-1]

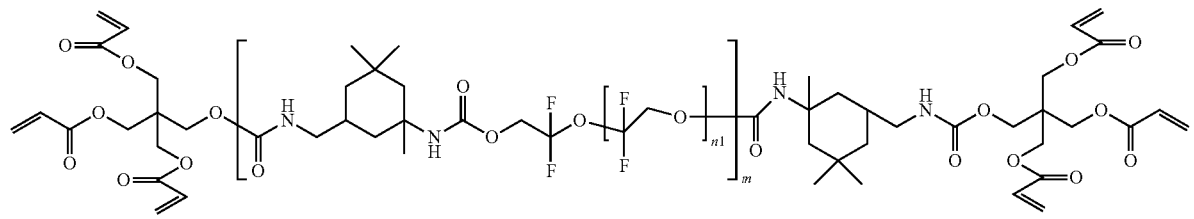

[Formula 1-2]

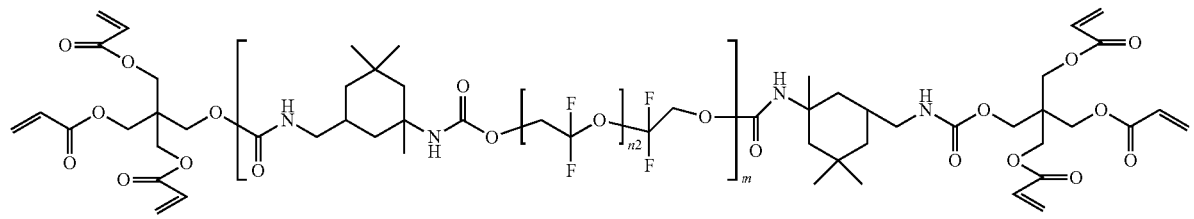

[Formula 1-3]

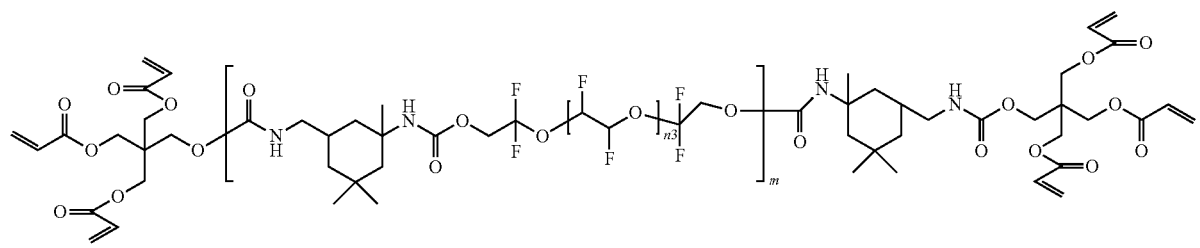

[Formula 1-4]

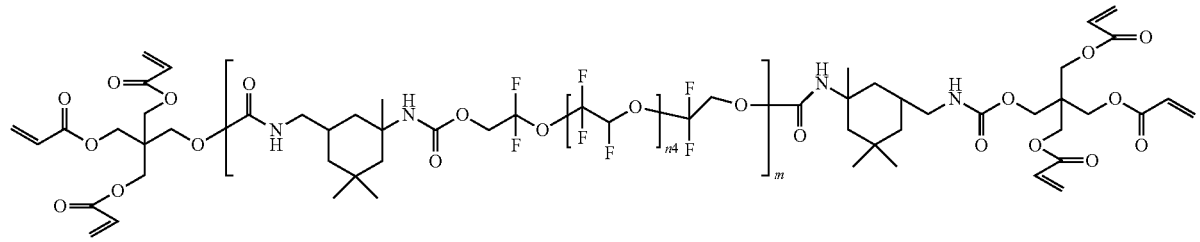

[Formula 1-5]

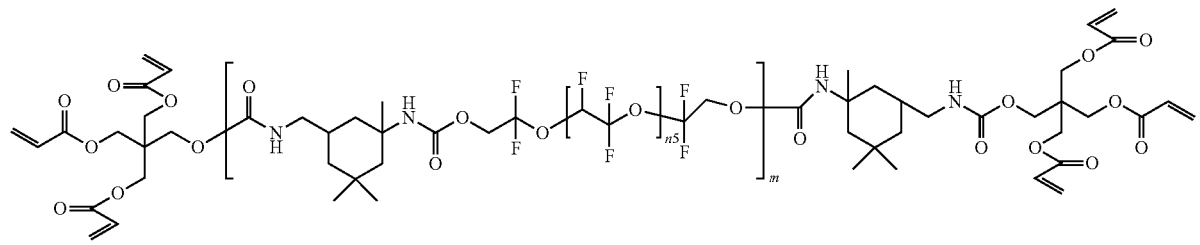

[Formula 1-6]

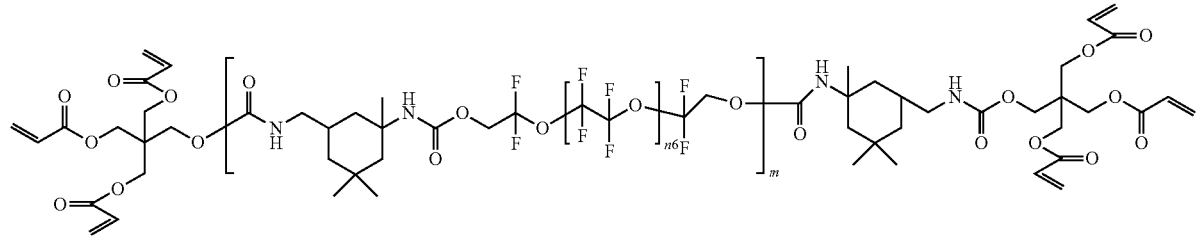

n1 to n6 are each independently an integer of 1 to 30, and m is an integer of 1 to 100.

In another aspect, the present invention provides a gel polymer electrolyte prepared by using the composition for a gel polymer electrolyte and a lithium secondary battery including the same.

Advantageous Effects

The composition for a gel polymer electrolyte according to the present invention uses an oligomer having excellent electrochemical safety, thereby suppressing the progress of the exothermic reaction to the ignition phenomenon by controlling the amount of heat generated even under extreme environments such as high temperature and high pressure, therefore, the high-temperature safety of a lithium secondary battery may be improved.

BEST MODE FOR CARRYING OUT THE INVENTION

Hereinafter, the present invention will be described in more detail to allow for understanding of the present invention.

It will be understood that terms or words used in the description and claims should not be construed as a general or dictionary definition but are to be construed as a meaning and concept that accord with the technical spirits of the present invention based on a principle that the inventors may properly define the concepts of terms in order to describe their own invention in best mode.

The terms used herein is for the purpose of describing exemplary embodiments only and is not intended to be limiting of the present invention. The singular expressions include the plural expressions, unless the context clearly means otherwise.

It will be understood that the terms "include", "provided with" or "have" when used in the description, specify the presence of stated features, numerals, steps, elements, or the combination thereof, but do not preclude the presence or addition of one or more other features, numerals, steps, elements, or the combination thereof Meanwhile, "*" used in the description means a connected part between the same or different atoms or between the terminal parts of a formula unless otherwise indicated herein.

<Composition for Gel Polymer Electrolyte>

A composition for a gel polymer electrolyte according to the present invention includes an oligomer; an additive; a polymerization initiator; a lithium salt; and a non-aqueous solvent.

Oligomer

First, the oligomer will be explained. The oligomer may be three-dimensionally combined to form a polymer network through polymerization reaction, and includes a fluorine-substituted or unsubstituted alkylene group, an amide group, and (meth)acrylate group.

According to types of an electrolyte used, a lithium secondary battery may be classified into a lithium secondary battery using a liquid electrolyte, and lithium polymer battery using a polymer electrolyte.

However, when a liquid electrolyte is used, it is highly likely to degrade an electrode material and volatilize an organic solvent, and also there is a problem in safety because combustion may be caused by increases in ambient temperature and temperature of the battery itself In particular, a thermal runaway phenomenon may occur when a liquid electrolyte exceeds the flash point due to overheating. The thermal runaway phenomenon has been known to occur at a high-temperature where a liquid electrolyte acts as a fuel such as oil in high-current, overcharging, and high temperature environments and chemically reacts with oxygen released from the positive electrode active material.

To solve such a problem, a protection circuit for current breaking, a safety exhaust outlet may be used when a battery is overheated over an arbitrary temperature, the above-mentioned devices are relatively expensive thereby leading to the burden of price.

Thus, the present invention uses a gel polymer electrolyte including a polymer network formed by three-dimensionally combining the oligomer in order to solve such problems. A gel polymer electrolyte formed by combining the oligomer has a less volatility even at high temperature than a liquid electrolyte, and thus exhibits high electrochemical stability. Thus, when a lithium secondary battery is used in the high temperature environment, or even when the internal temperature of the battery rises while the battery is being driven, it is possible to control amount of heat generated and suppress leading to ignition, thereby improving the high-temperature safety of the battery.

The first oligomer may be represented by Formula 1 below.

$$C-[B-A]_m-B'-C'$$ [Formula 1]

In Formula 1,

A is a unit including an alkylene group having 1 to 5 carbon atoms in which at least one fluorine is substituted or unsubstituted, B and B' are each independently a unit including an amide group, C and C' are each independently a unit including a (meth)acrylate group, and m is an integer of 1 to 100.

Meanwhile, m may preferably be an integer of 1 to 50, and more preferably an integer of 1 to 30. When m is within above-mentioned range, the oligomer represented by Formula 1 has a suitable weight-average molecular weight (Mw).

A weight-average molecular weight herein may mean a conversion value in terms of standard polystyrene as measured by gel permeation chromatograph (GPC), and unless otherwise specified, a molecular weight may mean a weight-average molecular weight. Here, the weight-average molecular weight may be measured by gel permeation chromatograph (GPC). For example, a sample specimen with a certain concentration is prepared, and thereafter a GPC measurement system alliance 4 instrument is stabilized. Once the instrument is stabilized, a standard specimen and a sample specimen are injected into the instrument to obtain chromatogram, and then the weight-average molecular weight is calculated (system: Alliance 4, column: Ultrahydrogel linear×2, eluent: 0.1 M $NaNO_3$ (pH 7.0 phosphate buffer, flow rate: 0.1 mL/min, temp: 40° C., injection: 100 μL)

The weight-average molecular weight (Mw) of an oligomer represented by Formula 1 may be controlled by the number of repeating units, and may be 1,000 to 20,000, particularly 1,000 to 15,000, and more particularly 1,000 to 10,000. When the weight-average molecular weight of the oligomer is within above-mentioned range, the mechanical strength and volatility of a battery including the same may be controlled, thereby suppressing the generation of combustible gas, and effectively improving the high-temperature stability. Therefore, it is possible to prepare a gel polymer electrolyte which has improved processability (formability) and battery stability, and etc.

Meanwhile, A is a unit including an alkylene group having 1 to 5 carbon atoms, which is substituted with at least one fluorine-substituted, or unsubstituted. The oligomer includes the unit A, thereby a high-temperature safety of a lithium secondary battery may be improved.

For example, the unit A may include at least one of units represented by Formulae A-1 to A-6 below.

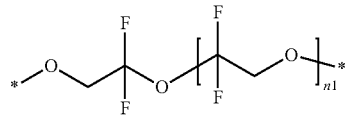

[Formula A-1]

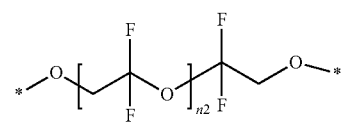

[Formula A-2]

[Formula A-3]

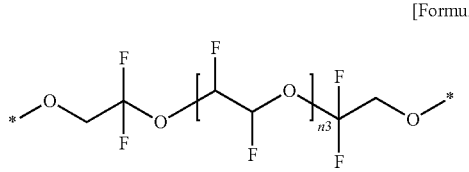

[Formula A-4]

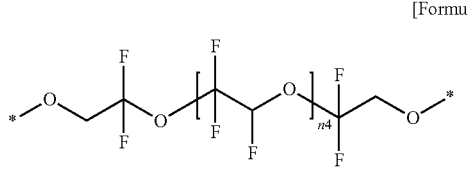

[Formula A-5]

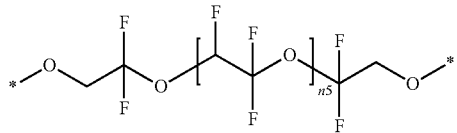

[Formula A-6]

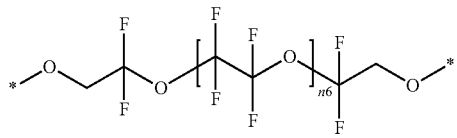

In Formulae A-1 to A-6, n1 to n6 are each independently an integer of 1 to 30.

Meanwhile, n1 to n6 may preferably each independently be an integer of 1 to 25, and more preferably may each independently be an integer of 1 to 20. When n1 to n6 each independently satisfy above-mentioned range, an oligomer having a weight-average molecular weight of a certain level may be formed, and resistance rise may be prevented.

In addition, the units B and B' are each independently a unit including an amide group for controlling ion transfer properties and imparting mechanical properties and adhesion for accomplishing a gel polymer electrolyte by using the oligomer.

For example, the units B and B' may each independently include a unit represented by Formula B-1 below.

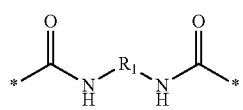

[Formula B-1]

In Formula B-1, $R_1$ is at least one selected from the group consisting of a linear or nonlinear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted aryl group having 6 to 20 carbon atoms, a unit represented by Formula $R_1$-1 below, and a unit represented by Formula $R_1$-2 below.

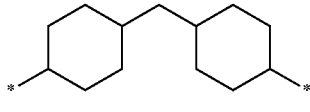

[Formula $R_1$-1]

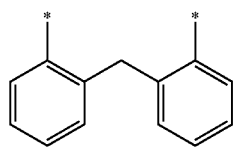

[Formula $R_1$-2]

As another example, in Formula B-1, $R_1$ may include at least one of units represented by Formulae $R_1$-3 to $R_1$-8 below.

[Formula R₁-3]

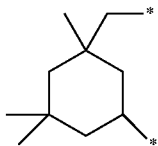

[Formula R₁-4]

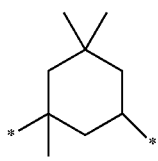

[Formula R₁-5]

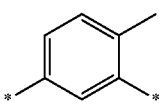

[Formula R₁-6]

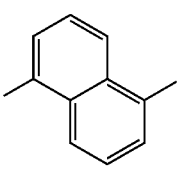

[Formula R₁-7]

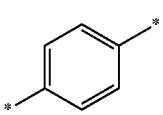

[Formula R₁-8]

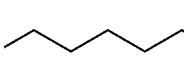

In addition, the units C and C' are units including a (meth)acrylate group such that oligomers are combined into a three-dimensional structure to form a polymer network. The units C and C' may be derived from a monomer that includes, within a molecular structure, at least one monofunctional or polyfunctional (meth)acrylate or (meth)acrylic acid.

For example, the units C and C' may each independently include at least one of units represented by Formulae C-1 to C-5 below.

[Formula C-1]

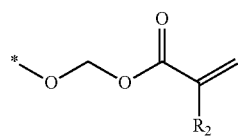

[Formula C-2]

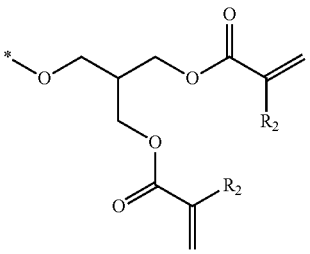

[Formula C-3]

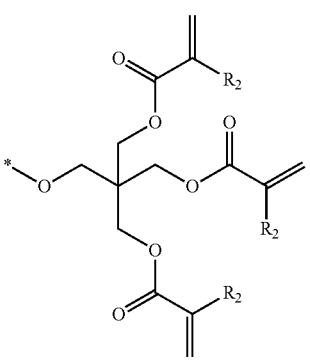

[Formula C-4]

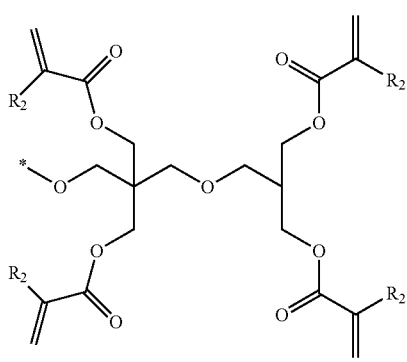

[Formula C-5]

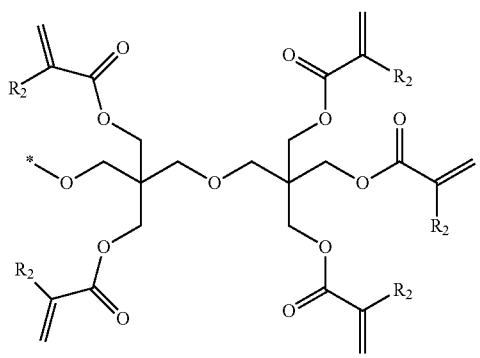

In Formulae C-1 to C-5, $R_2$ may each independently be one selected from the group consisting of hydrogen, and a substituted or unsubstituted alkylene group having 1 to 6 carbon atoms.

According to an embodiment of the present invention, the oligomer may include at least one compound selected from the group consisting of Formulae 1-1 to 1-6 below.

[Formula 1-1]
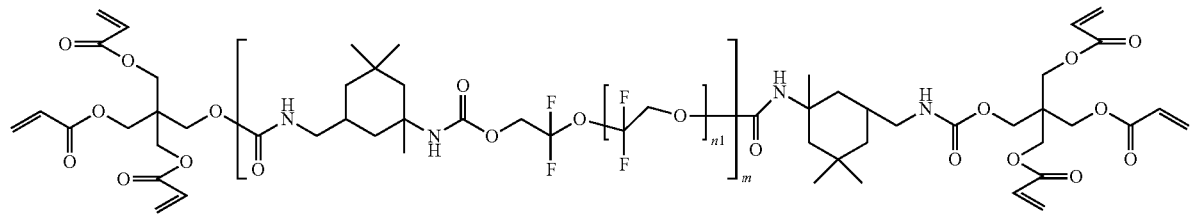
[Formula 1-2]
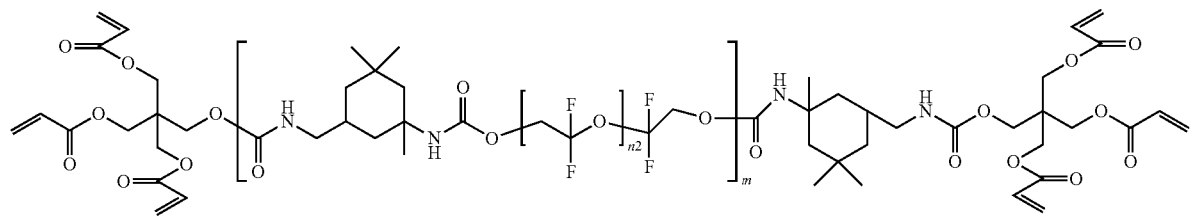
[Formula 1-3]
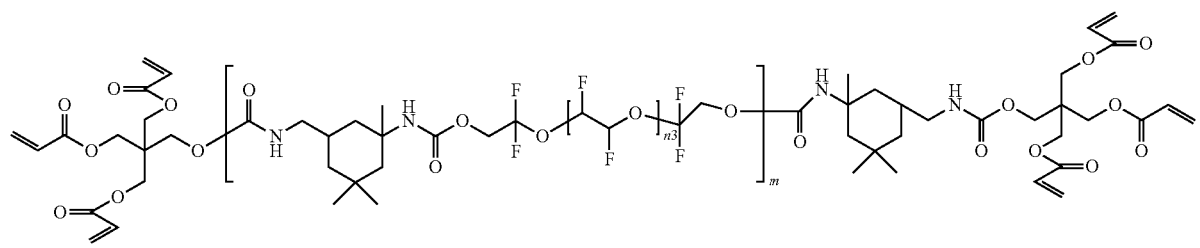
[Formula 1-4]
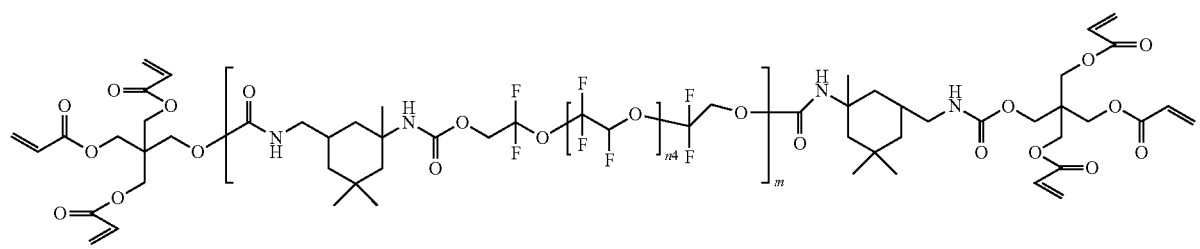
[Formula 1-5]
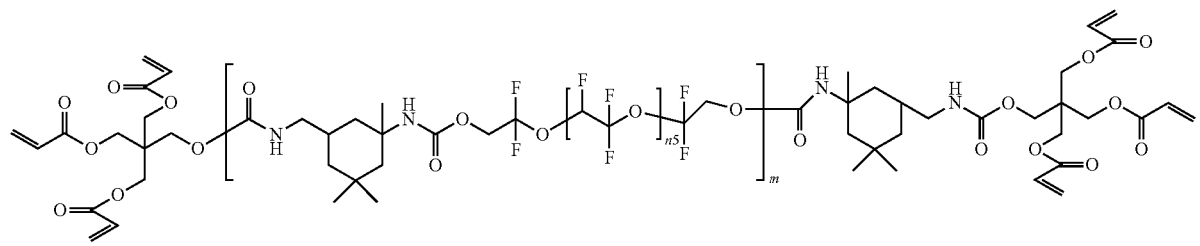
[Formula 1-6]
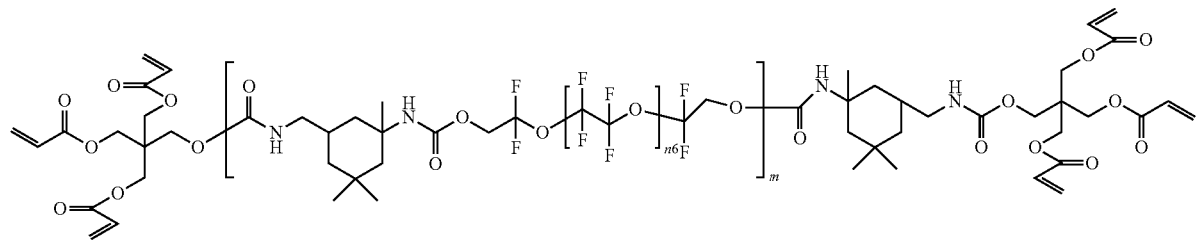
$n1$ to $n6$ are each independently an integer of 1 to 30, and $m$ is an integer of 1 to 100.
Meanwhile, $m$ may preferably be an integer of 1 to 50, and more preferably an integer of 1 to 30.

Meanwhile, with respect to 100 parts by weight of a composition for a gel polymer electrolyte, the oligomer may be included in an amount of 0.5 to 20 parts by weight, preferably 1.0 to 20 parts by weight, and more preferably 1.5 to 20 parts by weight. When the content of the oligomer is less than 0.5 parts by weight, a network reaction between the oligomers for forming the gel polymer electrolyte may be difficult to be formed; and when the content of the oligomer is more than 20 parts by weight, the viscosity of the gel polymer electrolyte exceeds a certain level, whereby impregnability, wetting property, and electrochemical stability in the battery may be degraded.

Additive

Next, an additive will be explained.

In the present invention, an additive may be at least one selected from the group consisting of a substituted or unsubstituted phosphate-based compound and a substituted or unsubstituted benzene-based compound.

When a gel polymer electrolyte is formed using the oligomer, the resultant has less volatility than a liquid electrolyte, thereby having high electrochemical safety, but, even when an oligomer is used alone, the resultant is continuously exposed to a relatively high temperature, which may lead to ignition and thermal runaway phenomena. To solve such a problem, the additive may be used to the composition for gel polymer electrolyte.

More specifically, when the substituted or unsubstituted phosphate-based compound is used as an additive, it is possible to suppress the generation of self-heat inside of the battery by removing the radicals formed from an electrolyte decomposition reaction, and etc. inside of the battery.

In addition, when the substituted or unsubstituted benzene-based compound is used as an additive, a radical compound may be stabilized and immobilized by the resonance structure of benzene (the benzene acts as a radical scavenger). Meanwhile, because halogen has seven valence electrons in its outermost shell, it can become a stable form when radical electrons are supplied, thereby removing the radical electrons by acting as a radical scavenger.

Specifically, the substituted or unsubstituted phosphate-based compound may include a compound represented by Formula 2 below.

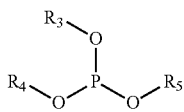

[Formula 2]

In Formula 2, $R_3$, $R_4$, and $R_5$ are each independently at least one selected from the group consisting of an alkyl group having 1 to 5 carbon atoms, which is substituted with at least one halogen group, and a silyl group.

Meanwhile, $R_3$, $R_4$, and $R_5$ are each independently at least one selected from the group consisting of Formulae 2a and 2b below.

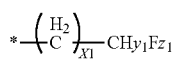

[Formula 2a]

In Formula 2a, $x_1$ is an integer selected from among integers of 0 to 4, $y_1$ and $z_1$ are each an integer selected from among integers of 0 to 3, and $y_1+z_1=3$,

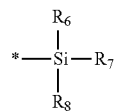

[Formula 2b]

In Formula 2b, $R_6$, $R_7$, and $R_8$ are each independently at least one substituted group selected from the group consisting hydrogen or an alkyl group having 1 to 5 carbon atoms.

For example, the substituted or unsubstituted phosphate-based compound may include at least one selected from the group consisting of compounds represented by Formula 2-1 and Formula 2-2 below.

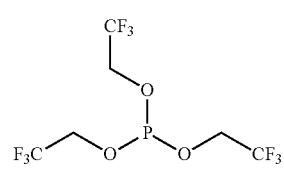

[Formula 2-1]

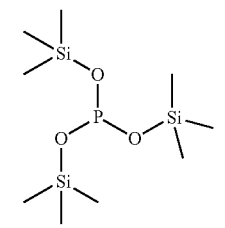

[Formula 2-2]

In addition, the substituted or unsubstituted benzene-based compound may include a compound represented by Formula 3 below.

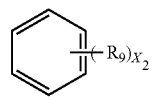

[Formula 3]

In Formula 3, $R_9$ is at least one selected from the group consisting of halogen group and a substituted or unsubstituted alkyl group having 1 to 5 carbon atoms, and $X_2$ is an integer selected from among 1 to 6.

For example, the substituted or unsubstituted benzene-based compound may include at least one selected from the group consisting of compounds represented by Formulae 3-1 and 3-2 below.

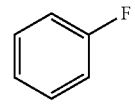

[Formula 3-1]

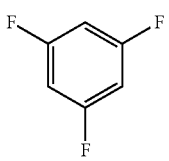

[Formula 3-2]

Meanwhile, with respect to 100 parts by weight of a composition for a gel polymer electrolyte, the additive may be included in an amount of 1 to 30 parts by weight, preferably 1 to 25 parts by weight, and more preferably 1 to 20 parts by weight. When the content of an additive is more than 30 parts by weight, it may affect a negative effect such as an increase in viscosity of the electrolyte, a decrease in ionic conductivity, an increase in cell resistance, and when the content of an additive is less than 1 parts by weight, it is difficult to serve as a radical scavenger.

Polymerization Initiator

Next, the polymerization initiator will be explained.

The polymerization initiator is for polymerizing the oligomer of the present invention to form a polymer network configured in a three-dimensional structure, and a conventional polymerization initiator known in the art may be used without limitation. According to the way of polymerization, a photopolymerization initiator or a thermal polymerization initiator may be used as the polymerization initiator.

Specifically, representative examples of the photopolymerization initiator may include at least one compound selected from the group consisting of 2-hydroxy-2-methyl-propiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethyl amino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadien-1-yl), bis[2,6-difluoro-3-(1H-pyrrol-1-yl)phenyl]titanium, 4-isobutylphenyl-4'-methylphenyl iodonium, hexafluorophosphate, and methyl benzoylformate.

In addition, representative examples of the thermal polymerization initiator may include at least one compound selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(iso-butyronitrile) (AIBN), and 2,2'-azobisdimethyl-valeronitrile (AMVN).

The polymerization initiator may be decomposed in a battery by heat, at a temperature of 30° C. to 100° C. or by light such as UV light at room temperature (5° C. to 30° C.) to form radicals, and form cross-linking by free radical polymerization, thereby allowing oligomers to be polymerized.

Meanwhile, with respect to 100 parts by weight of an oligomer, the polymerization initiator may be used in an amount of 0.01 to 5 parts by weight, preferably 0.05 to 5 parts by weight, and more preferably 0.1 to 5 parts by weight. When the content of a polymerization initiator is used within above-mentioned range, and the amount of an unreacted polymerization initiator which may adversely affect battery performance may be minimized. In addition, when the polymerization initiator is included within the above range, gelation may be appropriately performed.

Lithium Salt

Next, the lithium salt will be explained.

The lithium salt is used as an electrolyte salt in a lithium secondary battery, and is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and preferably may include $LiPF_6$, but is not limited thereto.

Meanwhile, the lithium salt may be included in an amount of 0.5 to 5 M, and preferably 0.5 to 4 M. When the content of the lithium salt is less than above-mentioned range, charging and discharging of the battery may not be performed properly, and when the content of the lithium salt exceeds above-mentioned range, the viscosity of the gel polymer electrolyte may be increased and wetting property in the battery may be deteriorated, thereby degrading battery performance.

Non-Aqueous Solvent

Next, the non-aqueous solvent will be explained.

In the present invention, a non-aqueous solvent is an electrolyte solvent, which is commonly used in a lithium secondary battery, and, as the non-aqueous solvent, for example, an ether, an ester (acetates, propionates), an amide, a linear carbonate or a cyclic carbonate, a nitrile (acetonitrile, SN, etc.), may be used in a mixture of at least two thereof or alone.

Among them, a carbonate-based electrolyte solvent including a cyclic carbonate, a linear carbonate or a carbonate compound which is a mixture thereof, may be used representatively.

Specific examples of the cyclic carbonate compound are a single compound or a mixture including at least two compounds selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. In addition, as particular examples of the linear carbonate compound, a compound or a mixture including at least two compounds selected from the group consisting of dimethyl carbonate (DMC), diethyl carbonate (DEC), dipropyl carbonate (DPC), ethylmethyl carbonate (EMC), methylpropyl carbonate, and ethyl propyl carbonate (EPC), may representatively be used, but is not limited thereto.

Particularly, among the carbonate-based electrolyte solvents, propylene carbonate and ethylene carbonate, which are cyclic carbonates, are organic solvents having high viscosity, and have a high dielectric constant because lithium salts in an electrolyte to be dissociated well, so that the propylene carbonate and the ethylene carbonate may preferably be used. In addition, when a linear carbonate, such as ethyl methyl carbonate, diethyl carbonate or dimethyl carbonate, having low viscosity and low dielectric constant, is mixed and used in an appropriate amount with the cyclic carbonate, an electrolyte having a high electrical conductivity may be obtained, so that the propylene carbonate and ethylene carbonate may be more preferably used.

In addition, among the electrolyte solvents, the ester may employ a single compound or a mixture including at least two selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, but is not limited thereto.

Other than the components described above, the composition for a gel polymer electrolyte according to an embodiment of the present invention may optionally further include other additives, inorganic particles, and the like, which are capable of achieving properties known in the art, in order to impart of increasing the efficiency of polymer network formation reaction of the oligomer and decreasing resistance.

As the other additives, for example, additives such as vinylene carbonate (VC), vinyl ethylene carbonate (VEC), propane sultone (PS), succinonitrile (SN), adiponitrile (AdN), ethylene sulfate (ESa), propene Sultone (PRS), fluoroethylene carbonate (FEC), $LiPO_2F_2$, lithium difluorooxalatoborate (LiODFB), lithium bis-(oxalato)borate (LiBOB), 3-trimethoxysilanyl-propyl-N-aniline (TMSPa), tris (trimethylsilyl) phosphite (TMSPi), and $LiBF_4$ are all applicable.

In addition, as the inorganic particles, a single compound or a mixture including at least two, selected from the group consisting of $BaTiO_3$ having dielectric constant of 5 or more, $BaTiO_3$, $Pb(Zr,Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$-$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, may be used.

Besides the listed above, inorganic particles having lithium ion transfer ability, that are, lithium phosphate ($Li_3PO_4$), lithium titanium phosphate ($Li_cTi_d(PO_4)_3$, $0<d<2$, $0<d<3$), lithium aluminum titanium phosphate ($Li_{a1}Al_{b1}Ti_{c1}(PO_4)_3$, $0<a1<2$, $0<b1<1$, $0<c1<3$), $(LiAlTiP)_{a2}O_{b2}$-based glass ($0<a2<4$, $0<b2<13$) such as $14Li_2O$-$9Al_2O_3$-$38TiO_2$-$39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as ($Li_{a4}Ge_{b4}P_{c2}S_d$, $0<a4<4$, $0<b4<1$, $0<c2<1$, $0<d<5$), lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c4<4$) such as $Li_3PO_4$-$Li_2S$-$SiS_2$, $P_2S_5$-based glass ($Li_{a7}P_{b7}S_{c5}$, $0<a7<3$, $0<b7<3$, $0<c5<7$) such as $LiI$-$Li_2S$-$P_2S_5$, or a mixture thereof, may be used.

<Gel Polymer Electrolyte>

Hereinafter, a gel polymer electrolyte according to the present invention will be explained.

According to an embodiment of the present invention, a gel polymer electrolyte is prepared using the composition for a gel polymer electrolyte.

The conventional gel polymer electrolyte has a problem in that the ionic conductivity thereof is less than a liquid electrolyte, and the stability and mechanical properties thereof are relatively weak when compared with a solid polymer electrolyte.

However, in the gel polymer electrolyte according to the present invention, a polymer network is formed by using an oligomer including unit A including an alkylene group having 1 to 5 carbon atoms in a fluorine is substituted or unsubstituted, units B and B' each independently including an amide group, and units C and C' each independently including (meth)acrylate group, so that ionic conductivity and mechanical properties may be improved, and a flame retardancy may also be improved due to low volatility and high electrochemical safety.

In addition, a gel polymer electrolyte according to the present invention contains the additive, and when the electrolyte formed of the gel polymer electrolyte composition is prepared, the flame retardancy thereof may further improved, thereby improving stability of a battery and high-temperature stability.

Meanwhile, the gel polymer electrolyte according to the present invention is formed by polymerizing a composition for a gel polymer electrolyte according to a commonly known method in the art. Generally, a gel polymer electrolyte may be prepared through in-situ polymerization or a coating polymerization.

More specifically, in-situ polymerization is a method of preparing a gel polymer electrolyte through step (a) for inserting, into a battery case, an electrode assembly composed of a positive electrode, a negative electrode, and a separator disposed between the positive electrode and the negative electrode, and step (b) injecting, into the battery case, the composition for a gel polymer electrolyte according to the present invention, and then polymerizing the resultant composition.

The in-situ polymerization reaction in a lithium secondary battery is possible through E-beam, γ-rays, and room temperature/high temperature aging process, and according to an embodiment of the present invention, the in-situ polymerization may be performed by thermal polymerization or photopolymerization. Here, a polymerization time takes approximately 2 minutes to approximately 12 hours, and a thermal polymerization temperature may be 30° C. to 100° C., and photopolymerization temperature may be a room temperature (5° C. to 30° C.).

More specifically, the in-situ polymerization reaction in a lithium secondary battery is performed such that a gel polymer electrolyte is formed by injecting the composition for a gel polymer electrolyte into a battery cell, and then subjecting to gelation through polymerization reaction.

As another method, the gel polymer electrolyte may be prepared in such a way that surfaces of an electrode and a separator are coated with the composition for a gel polymer electrolyte, is hardened (gelated) by using heat or light such as ultraviolet (UV) light, an electrode assembly is then prepared by winding or stacking an electrode and/or a separator on which a gel polymer electrolyte is formed the electrode assembly is inserted into a battery case, and a conventional liquid electrolyte is re-injected thereinto.

<Lithium Secondary Battery>

Next, the lithium secondary battery according to the present invention will be explained. A secondary battery according to another embodiment of the present invention includes a negative electrode, a positive electrode, a separator disposed between the positive electrode and the negative electrode, and a gel polymer electrolyte. The gel polymer electrolyte is the same as described above, and particular explanation thereof will be omitted.

Positive Electrode

The positive electrode may be prepared by coating on a positive electrode current collector with a positive electrode mixture slurry including a positive electrode active material, a binder, a conductive agent, a solvent, and etc.

The positive electrode current collector is not particularly limited so long as having conductivity without causing chemical changes in the battery, and, for example, may employ stainless steel, aluminum, nickel, titanium, fired carbon, or aluminum or stainless steel that is surface-treated with carbon, nickel, titanium, silver, or the like.

The positive electrode active material is a compound capable of reversibly intercalating and deintercalating, and may particularly include a lithium composite metal oxide including lithium and one or more metals such as cobalt, manganese, nickel and aluminum. More particularly, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (where $0<Y1<1$), $LiMn_{2-z1}Ni_{z1}O_4$ (where $0<Z1<2$), etc.), a lithium-nickel-cobalt-based oxide (e.g., $LiNi_{1-Y2}Co_{Y2}O_2$ (where $0<Y2<1$), etc.), a lithium-manganese-cobalt-based oxide (e.g., $LiCo_{1-Y3}Mn_{Y3}O_2$ (where $0<Y3<1$), $LiMn_{2-z2}Co_{z2}O_4$ (where $0<Z2<2$), etc.), a lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$, etc.), or $Li(Ni_{p2}Co_{q2}Mn_{r2})O_4$ (where $0<p2<2$, $0<q2<2$, $0<r2<2$, $p2+q2+r2=2$), etc.), or lithium-nickel-cobalt-transition metal (M) oxide (e.g., $Li(Ni_{p3}Co_{q3}Mn_{r3}M_{s1})O_2$ (where M is selected from the group consisting of Al, Fe, V, Cr, Ti, Ta, Mg and Mo, and p3, q3, r3 and s1 are atomic fractions of each independent elements, wherein $0<p3<1$, $0<q3<1$, $0<r3<1$, $0<s<1$, and $p3+q3+r3+s1=1$), etc.), and may include any one thereof or a compound of two or more thereof.

Among the above-listed compounds, in terms of increasing the capacity characteristics and stability of a battery, the lithium composite metal oxide may be $LiCoO_2$, $LiMnO_2$, $LiNiO_2$, a lithium nickelmanganesecobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickelcobaltaluminum oxide (e.g., $LiNi_{0.8}Co_{0.15}Al_{0.05}O_2$, etc.), etc., and when considering that the remarkably improved effect according to the control of the types and content ratio of constituent elements which form the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, etc., and may include any one thereof or a mixture of two or more thereof.

The positive electrode active material may be included in an amount of 60 to 99 wt %, preferably 70 to 99 wt %, and more preferably 80 to 98 wt %, based on the total weight of the solid content of the positive electrode mixture slurry excluding the solvent.

The binder is a component that assists in binding with the active material and the conductive agent, etc. and in binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, various copolymers, and the like.

Typically, the binder may be included in an amount of 1 to 20 wt %, preferably 1 to 15 wt %, and more preferably 1 to 10 wt %, based on the total weight of the solid content of the positive electrode mixture slurry excluding the solvent.

The conductive agent is a component for further improving conductivity of the positive electrode active material.

Any conductive agent, so long as having a conductivity without causing chemical changes in the battery, may be used, and may employ, for example, a conductive material, such as: graphite; carbon-based materials such as carbon black, acetylene black, Ketjen black, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives. Specific examples of a commercially available conductive agent include acetylene black-based products such as Chevron Chemical Company or Denka black (Denka Singapore Private Limited), Gulf Oil Company, Ketjen black, EC-based (Armak Company products), Vulcan XC-72 (Cabot Company products), and Super P (Timcal Co. products).

The conductive agent may be commonly included in an amount of 1 to 20 wt %, preferably 1 to 15 wt %, and more preferably 1 to 10 wt %, based on the total weight of the solid content of the positive electrode mixture slurry excluding the solvent.

The solvent may include an organic solvent such as N-methyl-2-pyrrolidone (NMP), and may be used in an amount satisfying a desirable viscosity when the positive electrode active material, and an optional binder and the conductive agent are included. For example, the solvent may be included such that the concentration of the solid content, which includes the positive electrode active material, and the optionally included binder and conductive agent, may be 50 to 95 wt %, preferably 70 to 95 wt %, and more preferably 70 to 90 wt %.

Negative Electrode

The negative electrode may be produced by coating a negative electrode current collector with a negative electrode mixture slurry including a negative electrode active material, a binder, a conductive agent and a solvent, or may use a graphite electrode consisting of carbon (C) or a metal itself.

For example, when the negative electrode current collector is coated with the negative electrode mixture slurry, the negative electrode current collector generally has a thickness of 3 to 500 µm. The negative electrode current collector is not particularly limited as long as having a high conductivity without causing chemical changes in the battery, and may use, for example, copper, stainless steel, aluminum, nickel, titanium, fired carbon, copper or stainless steel which is surface-treated with carbon, nickel, titanium, silver, or the like, an aluminum-cadmium alloy, or the like. In addition, as in the positive electrode current collector, the negative electrode current collector may have fine irregularities on the surface thereof to improve the bonding strength of a negative electrode active material, and the negative electrode current collector may be used in various shapes such as a film, a sheet, a foil, a net, a porous body, a foam body, and a non-woven fabric body.

The negative electrode active material may be, for example, one kind or at least two kinds selected from the group consisting of natural graphite, artificial graphite, a carbonaceous material; a lithium-containing titanium composite oxide (LTO), metals (Me): Si, Sn, Li, Zn, Mg, Cd, Ce, Ni or Fe; an alloy of the metals (Me); an oxide (MeOx) of the metals (Me); and a complex of the metals (Me) and carbon.

The negative active material may be included in an amount of 60 to 99 wt %, preferably 70 to 99 wt %, and more preferably 80 to 98 wt %, based on the total weight of the solid content of the positive electrode mixture slurry excluding the solvent.

The binder is a component that assists in binding between a conductive agent, an active material, and a current collector. Examples of such binder may be, for example, polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and various copolymers thereof.

The binder may be commonly included in an amount of 1 to 20 wt %, preferably 1 to 15 wt %, and more preferably 1 to 10 wt %, based on the total weight of the solid content of the negative electrode mixture slurry excluding the solvent.

The conductive agent is a component for further improving the conductivity of the negative electrode active material. The conductive agent is not particularly limited as long as having a conductivity without causing chemical changes in the battery, and may use, for example, a conductive material, such as: graphite such as natural graphite or artificial graphite; carbon black such as acetylene black, Ketjen black, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; a conductive metal oxide such as titanium oxide; or polyphenylene derivatives.

The conductive agent may be included in an amount of 1 to 20 wt %, preferably 1 to 15 wt %, and more preferably 1 to 10 wt %, based on the total weight of the solid content of the negative electrode mixture slurry excluding the solvent.

The solvent may include water or an organic solvent such as N-methyl-2-pyrrolidone (NMP), and may be used in an amount satisfying a desirable viscosity when the negative electrode active material, and an optional binder and conductive agent are included. For example, the solvent may be included such that the concentration of the solid content including a negative electrode active material, and the optionally included binder and a conductive agent, may be 50 to 95 wt %, preferably 70 to 90 wt %.

When metal itself is used as the negative electrode, the negative electrode may be formed from a metal thin film itself or prepared by physically bonding, rolling or vapor depositing the metal on the negative electrode current collector. Electro deposition or chemical vapor deposition may be used as a deposition technique.

For example, the metal thin film itself or a metal formed on the negative electrode current collector through binding/rolling/depositing may include one metal or an alloy of two metals selected from the group consisting of lithium (Li), nickel (Ni), tin (Sn), copper (Cu) and indium (In).

Separator

In addition, a separator may use a typically used porous polymer film, for example, which has been conventionally used as a separator. The separator may use, alone or in a laminated form, a porous polymer film formed from, for example, a polyolefin-based polymer, such as an ethylene homopolymer, a propylene homopolymer, an ethylene/butene copolymer, an ethylene/hexene copolymer, and an ethylene/methacrylate copolymer, or may use a typical porous non-woven fabric, for example, a non-woven fabric formed of high-melting-point glass fibers, or polyethylene terephthalate fibers. However, the separator is not limited thereto.

The outer shape of the lithium secondary battery of the present invention is not particularly limited, and thus a cylindrical shape using a can, a prismatic shape, a pouch shape, or a coin shape, may be used.

According to another example of the present invention, a battery module including the lithium secondary battery as a unit cell and a battery pack including the same, are provided. The battery module and the battery pack include the secondary battery having high capacity, high rate capability characteristics, and high cycle characteristics, and may thus be used as a power source of medium- and large-sized devices selected from the group consisting of an electric vehicle, a hybrid electric vehicle, a plug-in hybrid electric vehicle, and a power storage system.

Hereinafter, the present invention will be described in more detail through the particular examples. However, the examples below are only for helping the understanding of the present invention and should not be construed to limit the scope of the present invention. It would be obvious to a person skilled in the art that various changes and modifications are possible within the scope of this description and the technical spirit and such changes and modifications definitely are included in the scope of the attached claims.

EXAMPLES

1. Example 1

(1) Preparation of Composition for Gel Polymer Electrolyte

A composition for a gel polymer electrolyte was prepared by mixing ethylene carbonate (EC) and ethyl methyl carbonate (EMC) at a volume ratio of 3:7, and adding 0.7 M of $LiPF_6$ and 0.5 M of LiFSI to prepare a mixed solvent, and then adding, into 76.98 g of the prepared mixed solvent, 5 g of the oligomer represented by Formula 1-5 (weight-average molecular weight of 4,000), 10 g of the compound represented by Formula 2-1 as an additive, 0.02 g of a polymerization initiator (AIBN), and, as other additives, 1.5 g of VC, 0.5 g of PS, and 1 g of ESa.

(2) Manufacture of Lithium Secondary Battery

A positive electrode mixture slurry was prepared by adding, into N-methyl-2-pyrrolidone (NMP) which was a solvent, 97.5 wt % of $LiNi_{0.8}Co_{0.1}Mn_{0.1}O_2$ (NCM) as a positive electrode active material, 1.5 wt % of carbon black as a conductive agent, and 1 wt % of PVDF as a binder. An aluminum (Al) thin film having a thickness of about 20 μm, as a positive electrode current collector, was coated with the positive electrode mixture slurry and dried, and then, roll-pressed to prepare a positive electrode.

Next, an artificial graphite electrode was used as a negative electrode.

An electrode assembly was prepared by using the positive electrode, the negative electrode, and a separator formed of three layers of polypropylene/polyethylene/polypropylene (PP/PE/PP), the prepared composition for a gel polymer electrolyte was injected into the electrode assembly, the resultant mixture was left standing for 2 days, and the battery was heated at a temperature of 60° C. for 24 hours to manufacture a lithium secondary battery including the gel polymer electrolyte.

2. Example 2

A lithium secondary battery including a gel polymer electrolyte was manufactured in the same manner as in Example 1 except that, as an additive, 10 g of the compound represented by Formula 3-1 was added instead of 10 g of the compound represented by Formula 2-1 unlike Example 1.

COMPARATIVE EXAMPLES

1. Comparative Example 1

(1) Preparation of Electrolyte Solution

An electrolyte solution was prepared by using a mixed solvent obtained by mixing ethylene carbonate (EC) and ethyl methyl carbonate (EMC) at a volume ratio of 3:7, and adding 0.7 M of $LiPF_6$ and 0.5 M of LiFSI. 1.5 g of VC, 0.5 g of PS, and 1 g of Esa were added as the other additives to prepare an electrolyte solution.

(2) Manufacture of Lithium Secondary Battery

A positive electrode mixture slurry was prepared by adding 97.5 wt % of $LiNi_{0.8}Co_{0.1}Mn_{0.1}O_2$ (NCM) as a positive electrode active material, 1.5 wt % of carbon black as a conductive agent, and 1 wt % of PVDF as a binder to N-methyl-2-pyrrolidone (NMP) as a solvent. An aluminum (Al) thin film having a thickness of about 20 μm, as a positive electrode current collector, was coated with the positive electrode mixture slurry and dried, and then, roll-pressed to prepare a positive electrode.

Next, an artificial graphite electrode was used as a negative electrode.

An electrode assembly was prepared by using the positive electrode, the negative electrode, and a separator formed of three layers of polypropylene/polyethylene/polypropylene (PP/PE/PP), and the prepared electrolyte was injected into the electrode assembly to manufacture a lithium secondary battery.

2. Comparative Example 2

A lithium secondary battery including a gel polymer electrolyte was manufactured in the same manner as in Example 1 except that an acrylate-based oligomer composed of dipentaerythritol pentaacrylate was used instead of 5 g of the oligomer of Formula 1-6 unlike Example 1.

3. Comparative Example 3

A lithium secondary battery including a gel polymer electrolyte was manufactured in the same manner as in Example 1 except that the additive was not used unlike Example 1.

EXPERIMENTAL EXAMPLE

1. Experimental Example 1: Evaluation of High-Temperature Safety (Measurement of Amount of Heat Generated)

Lithium secondary batteries manufactured according to Examples 1-2 and Comparative Examples 1-3 were charged to SOC of 100% under the condition of a voltage of 4.25 V. Thereafter, the temperature was raised at a heating rate of 0.7° C./min, from 25° C., and the temperature was maintained for about 100 minutes in a temperature range of 120° C. vicinity (first temperature maintaining section). Thereafter, the temperature was raised again at a heating rate of 0.7° C/min and maintained in a temperature range of 150° C. vicinity (second temperature maintaining section). Thereafter, the temperature was raised again at a heating rate of 0.7° C./min and maintained in a temperature range of 200° C. vicinity (third temperature maintaining section), and then, the lithium secondary battery was exposed at high-temperature, and thereafter the amount of heat generated of the inside of the lithium secondary battery was measured (measured by a multi module calorimeter (MMC) 274 of NETZSCH Co., Ltd.), and the results thereof are represented in Table 1 below.

TABLE 1

|  | Amount of heat generated (J/g) in the second temperature maintaining section | Amount of heat generated (J/g) in the third temperature maintaining section |
|---|---|---|
| Example 1 | 45 | 95 |
| Example 2 | 37 | 84 |
| Comparative Example 1 | 580 | 1020 |
| Comparative Example 2 | 150 | 210 |
| Comparative Example 3 | 110 | 140 |

The amount of heat generated was not observed in the first temperature maintaining section in Examples and the Comparative Examples. It can be ascertained that, the batteries manufactured according to Examples exhibit low amount of heat generated in both the second and third temperature maintaining sections whereas the batteries manufactured according to Comparative Examples exhibit remarkably high amount of heat generated in both the second and third temperature maintaining sections.

2. Experimental Example 2: Evaluation of High-Temperature Storage (Measurement of Amount of Gas Generation)

Lithium secondary batteries manufactured according to Examples 1-2 and Comparative Examples 1-3 were charged to SOC of 100%, and the batteries were exposed at a temperature of 60° C. for 10 weeks, and then, the amount of gas generation in the batteries (the amount of gas generation by the oxidation reaction of the electrolyte on the positive electrode surface) was measured, and the results are presented in Table 2 below. When a large amount of gas, such as carbon monoxide (CO) or carbon dioxide ($CO_2$), is generated after high-temperature storage, the temperature in the battery rises, and accordingly, exothermic and ignition reactions may occur.

TABLE 2

|  | Gas amount (ml) after storage at a temperature of 60° C. for 10 weeks |
|---|---|
| Example 1 | 101 |
| Example 2 | 110 |
| Comparative Example 1 | 1050 |
| Comparative Example 2 | 310 |
| Comparative Example 3 | 220 |

Referring to Table 2, it can be ascertained that the batteries manufactured according to Examples have the small amount of gas generation whereas the batteries manufactured according to Comparative Examples have the remarkably large amount of gas generation. It seems that, in Examples, the electrolyte oxidation reaction on the positive electrode surface is suppressed, thereby reducing the amount of lattice oxygen (in the form of superoxide and peroxide) generated by the reaction, whereas in Comparative Examples, the oxidation reaction is not suppressed, thereby increasing the lattice oxygen and accordingly increasing the gas amount.

The invention claimed is:

1. A composition for a gel polymer electrolyte, the composition comprising:
an oligomer comprising a compound represented by Formula 1-5 below;
an additive in an amount of from 11 to 30 parts by weight with respect to 100 parts by weight of the composition;
a polymerization initiator;
a lithium salt; and
a non-aqueous solvent,
wherein the additive comprises a compound represented by Formula 3-1,

[Formula 1-5]

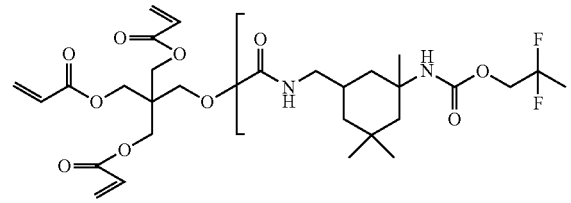

-continued

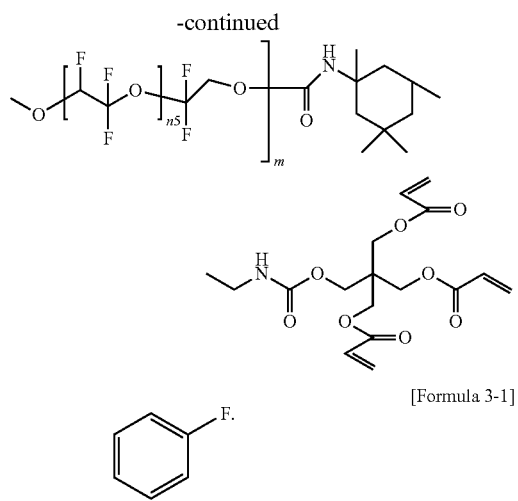

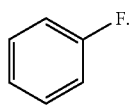

[Formula 3-1]

2. The composition according to claim 1, wherein the additive is present in an amount of from 11 to 20 parts by weight with respect to 100 parts by weight of the composition.

3. The composition according to claim 1, wherein the additive is present in an amount of from 13.68 to 30 parts by weight with respect to 100 parts by weight of the composition.

4. The composition according to claim 1, wherein the additive is present in an amount of from 13.68 to 20 parts by weight with respect to 100 parts by weight of the composition.

5. A gel polymer electrolyte prepared using the composition according to claim 1.

6. A lithium secondary battery comprising:
   a positive electrode;
   a negative electrode;
   a separator disposed between the positive electrode and the negative electrode; and
   the gel polymer electrolyte according to claim 5.

* * * * *